United States Patent [19]

Essenmacher

[11] 4,012,715
[45] Mar. 15, 1977

[54] ADAPTIVE INFORMATION SIGNAL DISCRIMINATOR

[75] Inventor: Albert M. Essenmacher, Livonia, Mich.

[73] Assignee: Burroughs Corporation, Detroit, Mich.

[22] Filed: Oct. 2, 1975

[21] Appl. No.: 618,799

[52] U.S. Cl. .................................. 340/146.3 AG
[51] Int. Cl.$^2$ ................................... G06K 9/00
[58] Field of Search .......... 340/146.3 C, 146.3 AG, 340/146.3 H, 146.3 R; 307/235 R

[56] References Cited

UNITED STATES PATENTS

| | | | |
|---|---|---|---|
| 3,159,815 | 12/1964 | Groce | 340/146.3 AG |
| 3,225,213 | 12/1965 | Hinrichs et al. | 340/146.3 AG |
| 3,869,698 | 3/1975 | Trost et al. | 340/146.3 AG |
| 3,911,212 | 10/1975 | Yoshizawa et al. | 340/146.3 AG |

OTHER PUBLICATIONS

Rackl, "Dynamic Threshold Circuit", IBM Tech. Disclosure Bulletin, vol. 15, No. 4, pp. 1138–1139, Sept., 1972.

*Primary Examiner*—Leo H. Boudreau
*Attorney, Agent, or Firm*—Robert C. J. Tuttle; Ronald L. Taylor; Carl Fissell, Jr.

[57] ABSTRACT

In a character recognition system, an improved adaptive information signal discriminator for detecting an information signal when it varies over a wide range and/or when the background noise varies over a wide range. The discriminator is able to adaptively follow the widely varying background noise level by averaging the response time of the discriminator. The discrimination of a widely varying information signal is had by summing a portion of the information signal with the supra background averaged level. The discrimination may be repeated to develop the required sensitivities as required to accurately process the data.

24 Claims, 3 Drawing Figures

ADAPTIVE INFORMATION SIGNAL DISCRIMINATOR

CROSS REFERENCE TO RELATED PATENTS

A patent entitled "Character Recognition Techniques" bearing U.S. Pat. No. 3,840,856 and granted Oct. 8, 1974 to William Robert Beall et al and assigned to Input Business Machines, Inc. describes and claims a character recognition system upon which the present invention is an improvement.

BACKGROUND OF THE INVENTION

1. Field of the Invention

This invention relates to discriminators in general and particularly to those for detecting widely varying information signals and background noise.

2. Prior Art

Previously, discriminators were designed to follow the lowest background noise level as detected with a relatively slower response to higher background noise levels. To compensate for this, various offset circuits were used to achieve different discriminator levels to match the varying environment. The disadvantage to such offsets is the inability to discriminate noise from signal when the background noise increases faster than the discriminator circuit can respond as the information signal ranges widely against relatively consistent background noise levels. As such the required offset circuits are relatively large and insensitive, and thus unable to detect low information signal values.

SUMMARY OF THE INVENTION

Accordingly, it is an object of the invention to provide an improved means of detecting information signals that are themselves widely ranging and/or occur against widely varying background noise levels.

It is another important object of the invention to provide a discriminator circuit able to follow an information signal as it widely ranges from its ambient level.

Yet another object of the invention is to provide a discriminator circuit able to detect an information signal as it appears against the background of a noise level that is widely varying.

Another object of the invention is to provide a discriminator circuit that requires relatively small offset circuits and is thus able to detect small valued information signals.

A final object of the invention is to provide a plurality of discriminators to accurately develop the required sensitivities as required to process the data represented by the information signal.

GENERAL DESCRIPTION OF THE PRIOR ART INVENTION

Figure 1:
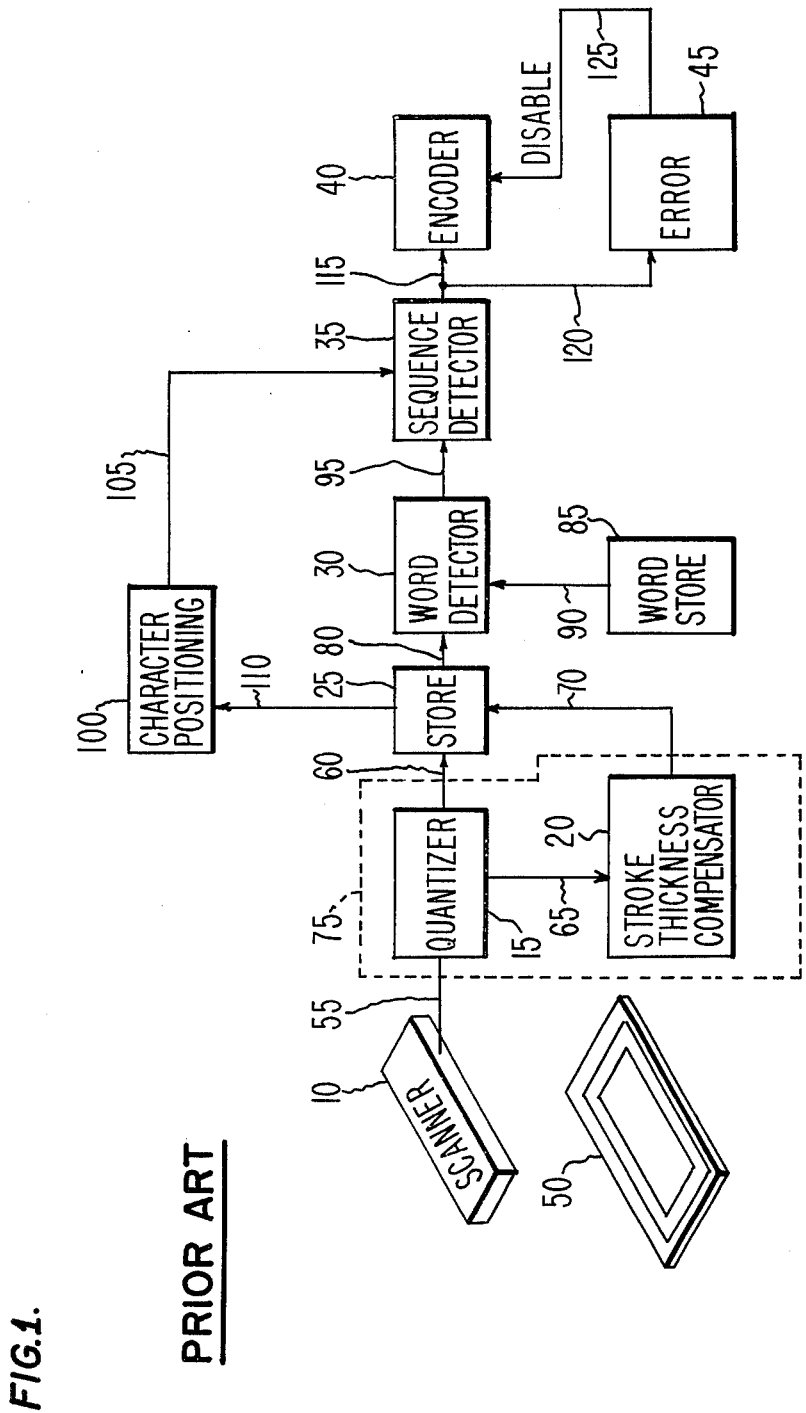
FIG. 1 is a block diagram of the prior art character recognition system.
Figure 2:
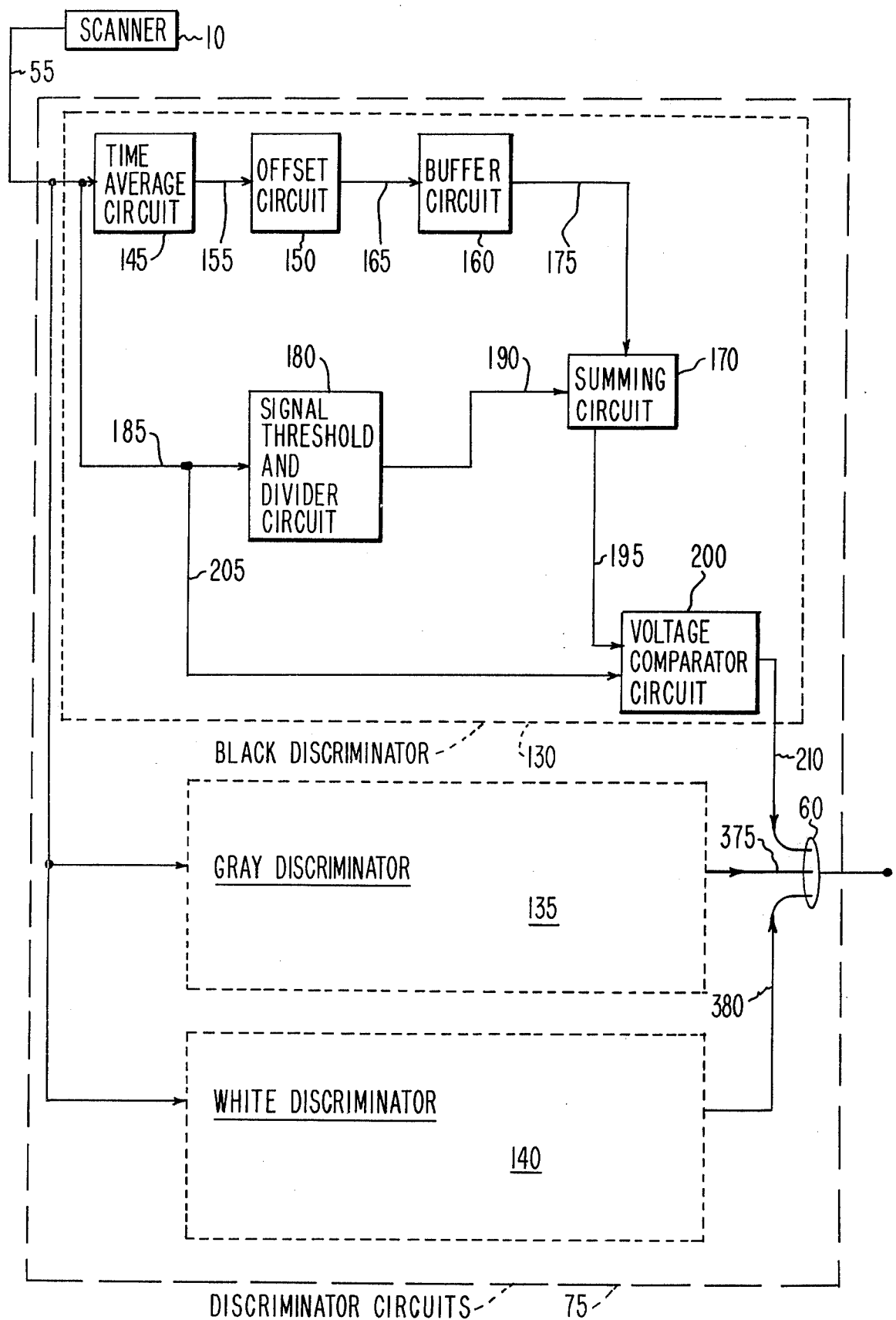
FIG. 2 is a block diagram of the improved discriminator operative to replace the prior art quantizer and stroke thickness compensator shown in FIG. 1.
Figure 3:
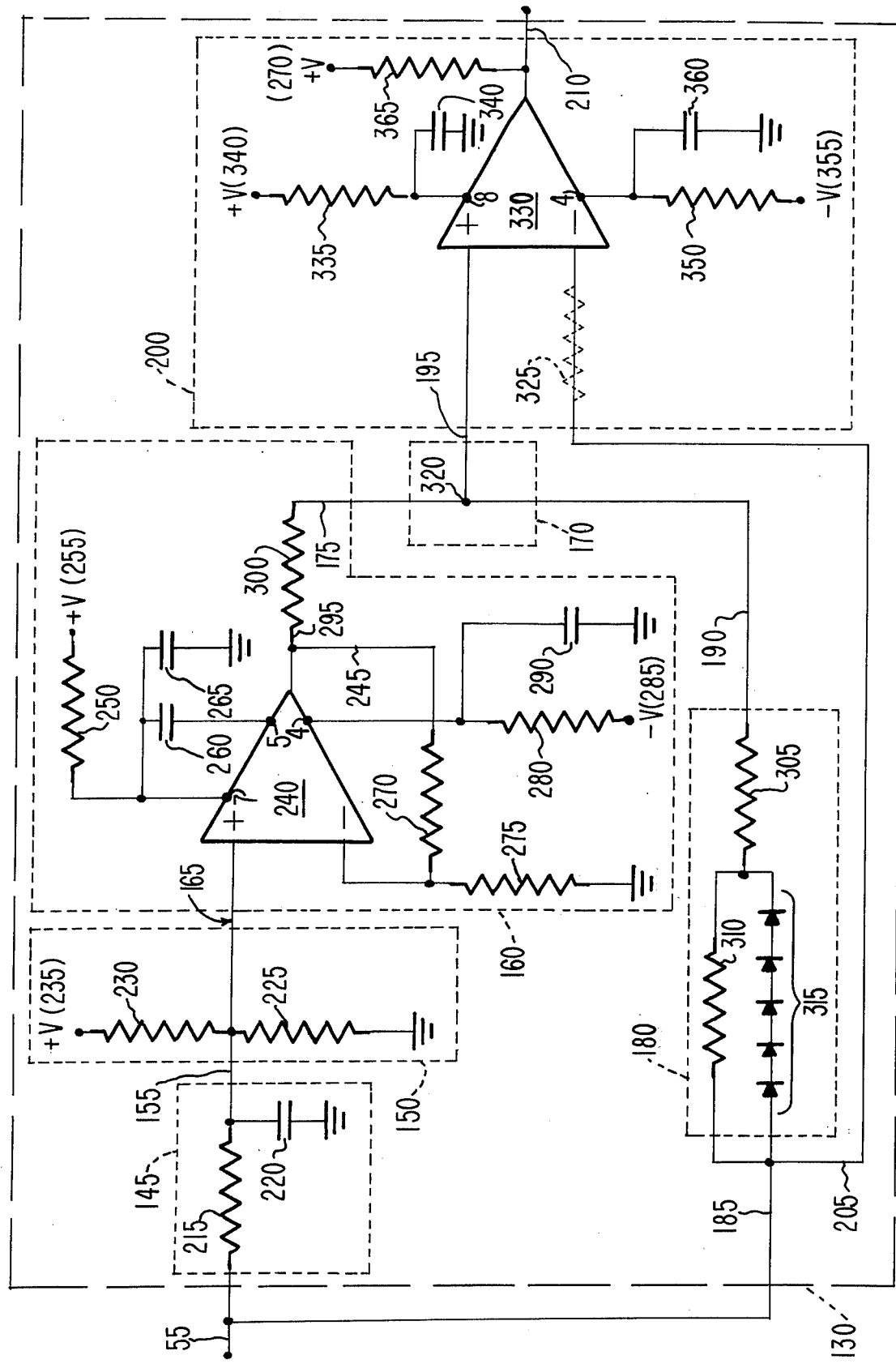
FIG. 3 is a schematic diagram of the black discriminator shown in FIG. 2.

Referring now to the drawings comprising FIGS. 1 through 3 wherein like component parts are identified by like reference numerals, there is illustrated particularly in FIG. 1 the prior art character recognition system as disclosed in the referenced U.S. Pat. No. 3,840,856. Accordingly, the character recognition system comprises scanner means 10, quantizing means 15, stroke thickness compensator means 20, storage means 25, word detecting means 30, sequence detecting means 35, encoding means 40 and error detecting means 45.

The scanning means 10 is in operable communication with a presented character such as an OCR or MICR encoded document 50 and is capable of deriving an array of voltages representative of the configuration of the present character 50. For purposes of describing the illustrated embodiment of the system, scanning means 10 will be assumed to be of the optical or OCR type as will be the encoded document 50. The output of scanning means 10 is coupled on line 55 to quantizing means 15. The purpose of the quantizing means is to convert the representative voltage produced by the scanning means 10 to corresponding binary signals. Quantizing means 15 is coupled on line 60 to storage means 25. In addition, stroke thickness compensating means is provided between the quantizing means 20 and the storage means 25 on lines 65 and 70. Stroke thickness compensating means 20 is adapted to compensate for nonuniformities in the presented character 50 that might be deleteriously reproduced by quantizing means 15. The quantizing means 15 and the stroke thickness compensator means 20 act together as a discriminator analog 75 to generate different quantizing levels representative of relatively black, gray and white optical signals, as read by the scanner means 10. The present invention is an improved discriminator replacement circuit for the discriminator analog 75. Storage means 25 is adapted to store each of the weighted binary signals produced by the multilevel quantizing means 15 to thereby retain field arrays of binary levels, each representing weighted geometric configuration of binary signals that is in approximate conformity with the geometric configuration of present character 50. Word detecting means 30 is coupled to storage means 25 on the line 80 and is adapted to examine each discrete area forming each weighted data field geometric configuration to determine if the information content of each examined discrete area is of a predetermined designation. More particularly, the information content of a discrete area is detected as a binary word. The detected binary word is then compared to a plurality of stored predetermined binary words in word storage means 85 on line 90. A favorable comparison therebetween results in a characterization of said detected binary word as one of said predetermined words.

Sequence detecting means 35 is coupled to word detecting means 30 on line 95 and is capable of sensing the order in which each binary word is identified by word detecting means 30. The sequence detecting means 35 is capable of storing a plurality of known sequences, each representing an alphanumeric character of a known type. As each binary word stored in storage means 25 is identified as being one of a predetermined plurality of binary words, the sequence of identified words is compared to each of the stored known sequences. A favorable comparison between a derived sequence and one of the known sequences results in an identification of presented character 50 as being the alphanumeric character associated with the known sequence. The sequence detecting means 35 is additionally coupled to character positioning means 100 on line 105, the latter being coupled to storage means 25 on line 110. Character positioning means 110 is particularly adapted to sense when the arrays of binary signals serially supplied to storage means 25 are centered therein such that the weighted data field geometric configurations are properly positioned within the storage means 25. When so weighted, the character positioning means 100 applies an enabling signal on lines 105 to the sequence determining means 35. The sequence detecting means 35 is thus inhibited from recognizing a derived sequence of identified binary words during that period when invalid word identification might occur.

To provide a translation from the high level humanlike intelligible language, outputted by the sequence detector means 35 to a low level machine-like language, an encoder means 40 is provided to be coupled on line 115 to the sequence detector means 35. Encoding means 40 may comprise a conventional coding device capable of producing a unique binary coded signal for each of a plurality of input signals, supplied thereto. The unique binary coded signals outputted by the encoding means 40 may be used to drive the downstream machine system that it was designed for. Error detecting means 45 is coupled on line 120 to the output of sequence detecting means 35 and is adapted to prevent the erroneous identification of present character 50 as being more than one predetermined type of alphanumeric character. The error detecting means 45 is further capable of detecting when the presented character 50 does not correspond to any of the known types of alphanumeric characters and, therefore, cannot be positively identified. The output of error detecting means 45 is coupled on line 125 to a disable input of encoding means 40 to prevent the encoding means 40 from transmitting a binary coded signal representative of an erroneous character.

DETAILED DESCRIPTION OF THE PRESENT INVENTION

In the preferred embodiment of the invention as shown in FIGS. 1, 2 and 3, the output of the scanner means 10 of the prior art character recognition system is operative to drive the improved adaptive information signal discriminator system 75 comprising the present invention as shown in FIGS. 2 and 3. There may be a plurality of individual discriminators disposed parallelly in the discriminator system 75 corresponding to the number of signal sensitivity levels desired. In the present invention there are only three discriminators 130, 135 and 140 representative of the black, gray and white OCR signals, respectively, derived from the OCR scanner 10. These OCR signals are electrical signals representative of the different possible contrast levels that may be experienced when optically reading the encoded document 50. In the black discriminator 130, as shown in FIGS. 2 and 3, the information signal including noise from the scanner 10 is received by a time averaging circuit 145 on the line 55 which, in turn, sends it to an offset circuit 150 on line 155. The offset circuit 150 outputs to a buffer stage circuit 160 on line 165 which, in turn, drives a summing circuit 170 on line 175. The information signal from the scanner 10 also inputs to a signal threshold and divider circuit 180 on line 185 which also outputs to the summing circuit on line 190 as did the supra buffer stage circuit 160. The summing circuit 170 is operative to send a signal on line 195 to a voltage comparator circuit 200 which compares it with the information signal on line 205 from the scanner 10 to derive a relatively noise free information signal therefrom on line 210. In this embodiment of the invention, the supra black discriminator 130 is repeated three times in units 130, 135 and 140 with a slightly different configuration each thereof to detect relatively black, gray and white signals respectively as will be elaborated on infra. The outputs of each of the discriminators 130, 135 and 140 travel on lines 210, 211 and 212 to the storage means 35 on cable line 60.

In particular as one embodiment of the invention, the improved discriminator may be used to replace the quantizer 15 and stroke thickness compensator 20 representing the discriminator analog 75 as shown in FIG. 1 of the prior art supra mentioned U.S. Pat. No. 3,840,856 to obtain the improved information signal discriminator through widely varying noise and signal levels as mentioned supra.

Particularly in the black discriminator circuit 130, there appears the time averaging or integration circuit 145, as shown in FIGS. 2 and 3, which is operative to dynamically follow the background noise level and average the signal over the response time of the time averaging circuit 145 and thus be able to detect information signals against wide variations in background noise. The black discriminator 130, as is shown in FIG. 3, schematically and the nearly identical gray and white discriminators 135 and 140 also shown in FIG. 3 but in block form have time averaging circuits 145 comprising simple RC circuit having a resistor (R) 215 and a capacitor (C) 220 therewithin. Their relative values as to the overall system are dependent on the transport speed of encoded documents readably being passed by the scanner 10 or the datacom speed in line 55. That is, the response time or period (T) where $RC = T$ must be small enough so that information signals will influence the level of the output from the time averaging circuit, but also large enough so that the charge-discharge times of the time averaged circuit 145 will be slow enough so as to slightly lag the incoming information signal with the net effected of following the information signal as a time average rather than in a time exact manner. As such, in fact, the information signal averaged in with the noise on line 155 is to be in fact the averaged representative of a widely varying noise level.

Because information signals generated by black areas on the encoded document 50 are very under contrasted, the informational signals so representative thereof are relatively weak and as such require a relatively short time period in the time averaging circuit 145 in the black discriminator 130 to generate the relatively quick response time needed to adequately represent the weak signal as against background noise levels as compared to the gray and white discriminators 135 and 140. As such, the capacitive 220 value of the time averaging circuit 145 in the black discriminator 130 is 0.01 uf, but 0.02 uf in the gray and white discriminators where the informational signal is relatively stronger. The resistance 215 in all three of the discriminators 130, 135 and 140 in the time averaging circuit 145 is 20 K ohms.

To achieve the different sensitivities required to more accurately distinguish the individual discriminators 130, 135 and 140 as among themselves, offset circuits 150 are used. The offset circuits 150 in the present invention need only use relatively small values compared to the prior art devices because of the sensitivity selectivity of other components of the invention, mainly the time averaging circuit 145 discussed supra and the signal threshold and divider circuit 185 to be discussed infra. Each of the offset circuits 150 derive their inputs on line 155 from the time averaging circuits 145. What the offsets 150 function as, is to set a DC bias level above or below which, depending on the circuit values used, the incoming informational signal must exceed or be less than to pass through. More precisely, the buffer circuit 160 which receives its input from the offset circuit 150 on line 165 will not be able to distinguish signals that do not meet the offset circuit 150 criterion. As such, each of the discriminators 130, 135 and 140 has a first dropping resistor 225 to ground with a value of 20 K ohms. Each also has a second dropping resistor 230 going to a +10 v. supply voltage 235. The black discriminator's 130 second resistor's 230 value is 360 K ohms, the gray discriminator's 135 second resistor's value 230 is 105 K ohms, and the white discriminator's 140 second resistor value 230 is 84.5 K. The incoming information signal to each of the discriminators 130, 135 and 140 is an analog signal with unmodulated swings of −6 v. to +6 v. for extreme white and black signals respectively from the scanner 10. Thus the offset circuit 150 for black discriminator 130 will set a bias level of +6 v., thus disabling the subsequent buffer circuit 160 from distinguishing any signal higher than that. The offset circuit 150 for the gray discriminator 135 will set up a bias level of ground, thus disabling the subsequent buffer circuit 160 from distinguishing any signal higher than that. The offset circuit 150 for the white discriminator 140 will get up a bias level of −6 v. thus disabling the subsequent buffer circuit 160 from distinguishing any signal lower than that. As such, the offset circuits 150 set up the differing sensitivity levels for the plurality of discriminators 130, 135 and 140 in the present invention.

Each of the buffer circuits 160 used in the discriminator system 75 is identical and comprises a National Semiconductor Corp. model 318 operational amplifier 240 with incoming input on line 165 connected to its noninverting (+) input and a feedback loop on line 245 being connected to its inverting (−) input. The operational amplifier 240 of the buffer circuit 160 is used here as an absolute amplifier with a gain of one to buffer the driving circuit comprising the offset circuit 150 from the driven circuit comprising the summing circuit 170 to be described infra. The operational amplifier 240 is connected at its "7" terminal to a 10 ohm dropping resistor 250 leading to a +10 v. supply voltage 255 as is the "3" terminal through a 0.1 uf capacitor 260, and the ground also through a 0.01 uf capacitor 265. The output of the operational amplifier is fed back on line 245 through a 20 K ohm resistor 270 to give negative feedback to the inverting input (−) as mentioned supra. The inverting input is also grounded through a 20 K ohm resistor 275. Terminal 4 of the operational amplifier receives its negative bias through a 10 ohm resistor 280 leading to a −10 v. voltage supply 285. The terminal 4 is also grounded through a 0.01 uf capacitor 290. The output of the operational amplifier 240 representing an unmodified dynamic threshold level on line 295 as will be seen infra is sent to a 20 K ohm dropping resistor 300 which is the output on line 175 of the buffer circuit 160 for each of the discriminators 130, 135 and 140 and the input to the infra described summing circuit 170. The net output of the supra three circuits of each of the discriminators 130, 135 and 140 is then a time response lag in DC offset.

For discrimination of signals over a wide range of signal strength, a portion of the informational signal and the included noise is summed directly with the background average signal described supra. Particularly, a signal threshold and divider circuit 180 is operative to receive an input of the original information signal on line 185. In the gray and white discriminators 135 and 140, this circuit is only a divider network represented by a 20 K ohm dropping resistor 305 which acts to sample only a portion of the incoming informational signal. In the black discriminator 130, it is assumed, as described supra, that the black signals that are to be discriminated are only lightly contrasted and thus relatively weak. As such, in the black discriminator 130 only, a 6,800 ohm dropping resistor is to be inserted in line between the supra 20 K ohm resistor 305 and the incoming informational signal on line 185 to further attenuate the relatively strong signal so that it may fall within the operational input signal level of the subsequent voltage comparator to be described supra as thereby not to distort its saturation. As such, the 20 K ohm and/or 6800 ohm dropping resistors 305 and 310 act as the dividing circuit in the signal threshold and divider circuits 180 of the respective discriminators 130, 135 and 140. Where the incoming information signal is relatively very strong, as compared to the signal to be sensed as in the black discriminator 130, a signal threshold circuit 315 is additionally included in the signal threshold and divider circuit 180. This circuit 315 comprises five diodes in series that parallel the 6800 ohm dropping resistor 310. The five diodes 315 act as a short circuit for all incoming informational signals above +3 v. This acts to provide additional dropping resistance to attenuate the incoming informational signal where the incoming informational signal is now relatively strong as compared to the sensed signal. The output of the signal threshold and divider circuit 180 is sent to the summing circuit 170 on line 190 as is the output of the buffer circuit 160 on line 175 in each of the discriminators 130, 135 and 140 as mentioned supra. The summation circuit 170 is only a terminal 320 in this embodiment, but serves a most important purpose in that it allows the time averaging circuit 145, the offset circuit 150 and the buffer circuit 160 as outputted on line 175 to interact in a summing fasion with the signal threshold divider circuit 180 as outputted on line 190. The summed signal outputted on line 195 represents a modified dynamic threshold level of the supra described unmodified dynamic threshold level on line 175. That is to say that unmodified dynamic threshold level on line 175 was a time averaged signal representing widely ranging levels of noise whereas the output of the signal threshold and divider circuit 180 on line 190 is a scaled down portion of incoming information signal on line 55 representing the possible wide fluctuations thereof as they occur. As such, the summation of these two signals give us a third signal on line 195 which is a very closely averaged and well followed representative of the background noise and signal level inherent in an environment where noise and signal may vary widely in the same or opposite directions and thus must be tracked closely and with a relatively short time response as does the averaged summed signal here. The summed signal on line 195 as generated is then fed into the noninverting (+) input of the voltage comparator 200.

In the black discriminator 130 where a relatively weak signal is being sensed, the informational signal on line 205 is allowed to proceed without attenuation to the inverting input (−) of the voltage comparator 200. In the gray and white discriminators 135 and 140 where less sensitivity is needed, a 20 K ohm dropping resistor 325 is disposed between the information signal on line 205 and the inverting input of the voltage comparator 200. The voltage comparator 200 itself consists of an operational amplifier 330 used as an analog to digital converter device. The preferred operational amplifier 330 is a National Semiconductor Corp. model 311. The 8 terminal of the operational amplifier 330 of each of the discriminators 130, 135 and 140 is coupled through a 10 ohm dropping resistor 335 to a +10 v. voltage supply 340 and separately through a 0.01 uf capacitor 35 to ground. The 4 terminal of the operational amplifier 330 is coupled through a 10 ohm dropping resistor 350 to a −10 v. supply voltage 355 and separately through a 0.01 uf capacitor 360 to ground. Bias for the output of the operational amplifier 330 is supplied through a 1 K ohm dropping resistor 365 from a +5 v. supply voltage 370. When the incoming informational signal, sampled by the voltage comparator 200, on line 205, exceeds or falls short of the modified dynamic threshold level signal on line 195 at any point in time, the operational amplifier 330 will saturate or unsaturate respectively to output a digital signal accordingly to thus achieve an analog to digital transformation in each of the voltage comparators 200 in the discriminators 130, 135 and 140. The black, gray and white discriminators 130, 135 and 140 will accordingly output digital signals on lines 210, 375 and 380 reflecting each of the respective selected sensitivities derived from the inputted analog informational signal from the scanner 10.

While the above referenced embodiments of the invention have been described in considerable detail, it will be appreciated that other modifications and variations therein may be made by those skilled in the art without departing from the true spirit and scope of the invention.

What is claimed is:

1. In a character recognition system having an OCR scanner disposed to read an encoded document and output a representative analog informational signal having noise, an improved adaptive informational signal discriminator comprising:
   time response means, having a predetermined response period, for receiving the informational signal input from the scanner and time averaging the informational signal over the response period to dynamically minimize widely varying noise levels contained therein;
   divider means operative to receive the informational signal from the scanner for outputting a scaled-down representation thereof;
   summing means being inputted thereto by said time response means and said divider means for outputting a summed signal that dynamically minimizes widely ranging informational signal levels as well as wide ranging noise levels; and
   comparator means operative to receive the informational signal from the scanner and a signal from said summing means for comparison thereof and for outputting a digital signal when the informational signal exceeds the dynamic summed signal.

2. The discriminator of the character recognition system as defined in claim 1 further comprising offset means being disposed between said time response means and said summing means for setting a bias level indicative of the sensitivity desired for the time averages signal of said time response means.

3. The discriminator of the character recognition system as defined in claim 2 wherein said offset means comprises a first resistor means grounded at one end and a second resistor means biased at one end where both resistors means are commonly connected at their other ends through which the informational signal flows.

4. The discriminator of the character recognition system as defined in claim 3 wherein said first resistive means is a resistor.

5. The discriminator of the character recognition system as defined in claim 3 wherein said second resistive means is a resistor.

6. The discriminator of the character recognition system as defined in claim 2 further comprising buffer means for isolating said offset means from said summing means.

7. The discriminator of the character recognition system as defined in claim 6 wherein said buffer means is an operational amplifier.

8. The discriminator of the character recognition system as defined in claim 1 wherein said divider means further comprises signal threshold signals means comprising:
   resistive means disposed between the scanner and said divider means for further attenuation of the inputted information signal when relatively high sensitivity is required when discriminating the informational signals; and
   diode means disposed in parallel with said resistive means for further attenuation when sufficiently forward biased of the information signal when relatively very high sensitivity is required when discriminating the informational signals.

9. The discriminator of the character recognition system as defined in claim 8 wherein said resistive means of said divider means is a resistor.

10. The discriminator of the character recognition system as defined in claim 8 wherein said diode means is a plurality of diodes.

11. The discriminator of the character recognition system as defined in claim 10 wherein said plurality of diodes comprises five diodes.

12. The discriminator of the character recognition system as defined in claim 1 wherein said comparator means further comprises resistive means disposed between the scanner and said comparator means for attenuating relatively strong informational signals when a relatively low sensitivity is required as to the informational signal being discriminated.

13. The discriminator of the character recognition system as defined in claim 12 wherein said resistive means is a resistor.

14. The discriminator of the character recognition system as defined in claim 1 wherein said time response means is a resistive-capacitive means for time averaging the inputted informational signal.

15. The discriminator of the character recognition system as defined in claim 14 wherein said resistive-capacitive means is a resistor and a capacitor.

16. The discriminator of the character recognition system as defined in claim 1 wherein said divider means is a resistor means for attenuating the inputted informational signal.

17. The discriminator of the character recognition system as defined in claim 16 wherein said resistive means is a resistor.

18. The discriminator of the character recognition system as defined in claim 1 wherein said summing means is a terminal means for summing the signals from said divider means and said time response means.

19. The discriminator of the character recognition system as defined in claim 18 wherein said terminal means is a terminal.

20. The discriminator of the character recognition system as defined in claim 1 wherein said comparator means is a voltage comparator for comparing the voltage levels of the signals from the scanner and said summing means.

21. The discriminator of the character recognition system as defined in claim 20 wherein said voltage comparator means is an operational amplifier.

22. An improved discriminator circuit in a character recognition device having a scanner operative to output an analog informational signal having noise therein read from an OCR encoded document, comprising:
 a. resistive-capacitive means, characterized by a predetermined response period, operative to receive the informational signal from the scanner for time averaging the information signal over the response period to dynamically minimize widely varying ranges of noise contained therein;
 b. resistive means operative to receive the informational signal from the scanner for divisionally outputting a scaled-down respresentation thereof;
 c. terminal means operative to receive inputs from said resistive-capacitive means and said resistive means for outputting a summed signal that dynamically minimizes widely varying information signal levels as well as wide ranging noise levels; and
 d. voltage comparator means for comparing the informational signal from the scanner with the output from said terminal means for outputting a digitized signal when the informational signal exceeds the dynamically summed signal of said terminal means.

23. A method for discriminating an analog informational signal having noise read by a scanner in a character recognition mechanism through widely varying ranges of informational signal strengths and background noise, said method comprising the steps of:
 a. time averaging the informational signal received from the scanner over the response period thereof to dynamically minimize widely varying noise levels contained therein;
 b. dividing the informational signal from the scanner to generate a portional representation thereof;
 c. summing the time averaged signal and the divided signals to dynamically minimize widely ranging informational signal levels as well as wide ranging noise levels; and
 d. comprising the informational signal from the scanner with the summed signal to obtain a digital representation thereof when the informational signal becomes greater than the dynamic summed signal.

24. In an optical character recognition system of the type having a sensor for reading optically encoded information on a document and outputting an analog signal representative of such information, the analog signal bearing a background noise component and an information component, an improved adaptive information signal discriminator comprising:
 signal averaging means, responsive to the analog signal, for averaging the analog signal over a predetermined response period and outputting a time-average signal representative of the background noise component over the predetermined response period;
 signal scaling means, responsive to the analog signal, for outputting a scaled-down representation of the analog signal;
 summing means, having as inputs the time-average signal and scaled-down analog signal, for summing both inputs and outputting a threshold signal representing the summed signals; and
 comparator means, having as inputs the threshold signal and analog signal, for comparing said inputs and outputting a digital signal when the analog signal is high relative to the threshold signal, thereby effecting a discrimination between noise and information in the analog signal.

* * * * *